(12) United States Patent
Redmer et al.

(10) Patent No.: US 9,248,862 B1
(45) Date of Patent: Feb. 2, 2016

(54) VEHICLE BODY STRUCTURE

(71) Applicant: Nissan North America, Inc., Franklin, TN (US)

(72) Inventors: Emily Redmer, Berkley, MI (US); Taiji Ikeda, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/593,690

(22) Filed: Jan. 9, 2015

(51) Int. Cl.
*B62D 25/02* (2006.01)
*B62D 25/04* (2006.01)
*B62D 25/20* (2006.01)

(52) U.S. Cl.
CPC .............. *B62D 25/04* (2013.01); *B62D 25/025* (2013.01)

(58) Field of Classification Search
CPC ........ B62D 25/02; B62D 25/04; B62D 27/02; B62D 27/023
USPC .................. 296/203.01, 203.03, 193.06, 209
See application file for complete search history.

(56) References Cited

U.S. PATENT DOCUMENTS

| | | | |
|---|---|---|---|
| 5,938,275 A | * | 8/1999 | Kleinhans .............. B62D 25/02 296/191 |
| 6,464,290 B2 | | 10/2002 | Schwarz et al. |
| 6,709,045 B2 | | 3/2004 | Shuto et al. |
| 6,722,729 B2 | | 4/2004 | Yoshida et al. |
| 6,957,845 B2 | | 10/2005 | Rager |
| 7,032,959 B2 | | 4/2006 | Berstecher et al. |
| 7,765,699 B2 | | 8/2010 | Corcoran et al. |
| 8,096,741 B2 | | 1/2012 | Denton et al. |
| 8,491,047 B1 | | 7/2013 | Moll |
| 8,657,368 B2 | | 2/2014 | Freeman et al. |
| 8,888,173 B2 | | 11/2014 | Nydam et al. |
| 8,991,909 B2 | * | 3/2015 | Matsuda ................. B62D 25/02 296/187.12 |
| 2002/0190544 A1 | | 12/2002 | Yomamoto et al. |

FOREIGN PATENT DOCUMENTS

| | | | |
|---|---|---|---|
| FR | 2902399 | * | 12/2007 |
| JP | 4-56687 | * | 2/1992 |
| WO | 0181154 A2 | | 11/2001 |

* cited by examiner

*Primary Examiner* — Dennis H Pedder
(74) *Attorney, Agent, or Firm* — Global IP Counselors, LLP

(57) ABSTRACT

A vehicle body structure includes a pillar structure, a sill structure and a reinforcement member. The pillar structure has a box section defining a cavity. The sill structure has an upper surface defining an aperture. The reinforcement member is disposed within the cavity of the pillar structure, extends through the aperture and is attached to the sill structure.

15 Claims, 8 Drawing Sheets

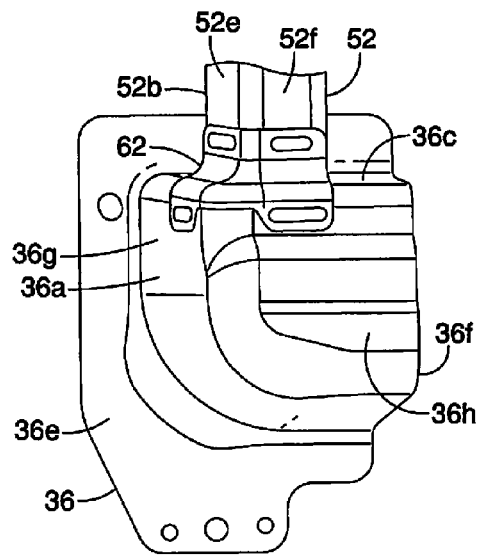
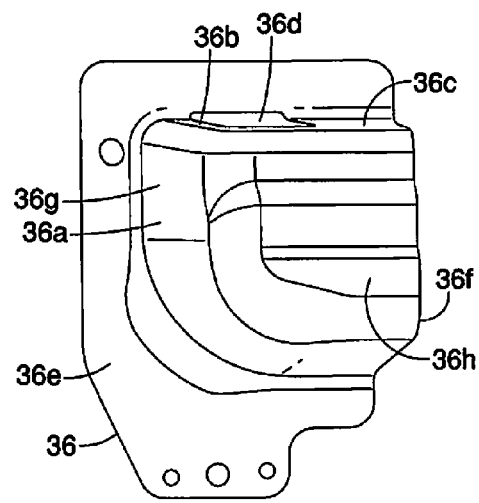
FIG. 10   FIG. 11
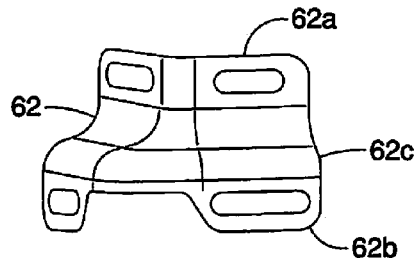
FIG. 12
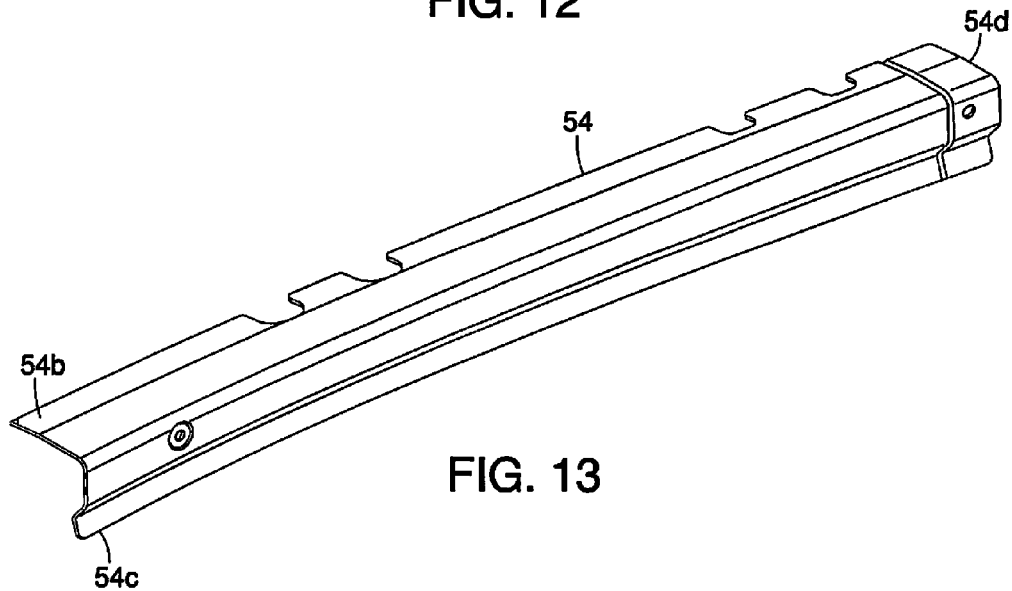
FIG. 13

VEHICLE BODY STRUCTURE

BACKGROUND

1. Field of the Invention

The present invention generally relates to a vehicle body structure. More specifically, the present invention relates to reinforcement of a pillar structure in a vehicle body structure.

2. Background Information

Vehicles are continually being redesigned to improve narrow offset and roof crush test performance. Such redesigns can include improvements to the vehicle body structure, including improvements to the pillar structures (e.g., the A-pillars, the B-pillars, etc.). One challenge involves improving narrow offset and roof crush test performance a vehicle frame structure without appreciably increasing the cost of producing the vehicle.

SUMMARY

It has been discovered that there exists a need for maintaining the strength of a vehicle frame structure without appreciably increasing the cost of producing the vehicle. This invention addresses this need in the art as well as other needs, which will become apparent to those skilled in the art from this disclosure.

In view of the state of the known technology, one aspect of the present disclosure is to provide a vehicle body structure comprising a pillar structure, a sill structure and a reinforcement member. The pillar structure has a box section defining a cavity. The sill structure has an upper surface defining an aperture. The reinforcement member is disposed within the cavity of the pillar structure, extends through the aperture and is attached to the sill structure.

BRIEF DESCRIPTION OF THE DRAWINGS

Referring now to the attached drawings which form a part of this original disclosure:

FIG. 10 is an enlarged perspective view of the lower section of the reinforcement member of FIG. 8 connected to a cap for the sill structure by mounting bracket;

FIG. 11 is a perspective view of the cap for the sill structure shown in FIG. 10;

FIG. 12 is a perspective view of the mounting bracket shown in FIG. 10; and FIG. 13 is perspective view of a bracket for the roof side rail shown in FIG. 4;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
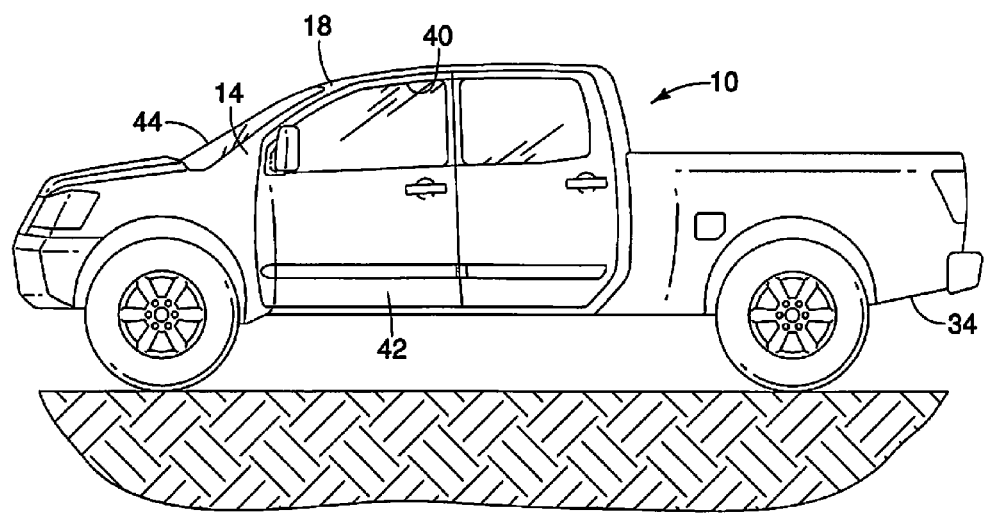
FIG. 1 is an elevational side view of a vehicle that includes a body structure in accordance with an embodiment of the present invention.
Figure 2:
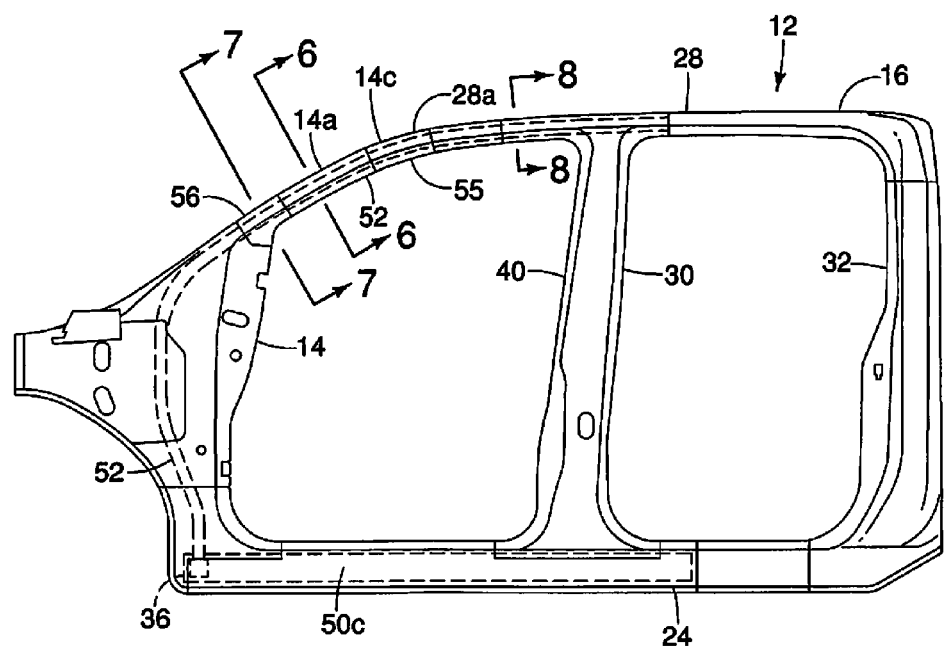
FIG. 2 is an elevational side view of the exterior portion of the vehicle body structure in accordance with an embodiment of the present invention.

Referring initially to FIGS. 1 and 2, a pick-up truck vehicle 10 is illustrated that includes a vehicle body structure 12 in accordance with a first embodiment. The pick-up truck vehicle 10 includes a pillar structure 14 as described in more detail below.

As illustrated in FIGS. 1-5, the pick-up truck vehicle 10 includes a pair of sub-assemblies 16. Since the sub-assemblies 16 are symmetrical (mirror images of one another), but otherwise identical, description of one sub-assembly applies to both. Specifically, one of the sub-assemblies 16 forms a portion of the vehicle body structure 12 on the driver's side of the pick-up truck vehicle 10 and the other of the sub-assemblies 16 forms a portion of the vehicle body structure 12 on the passenger's side of the pick-up truck vehicle 10.

The vehicle body structure 12 also includes a roof structure 18 (FIG. 1) having roof braces (not shown) as well as other conventional roof structural elements (only outer body panels are shown in FIG. 1).

Figure 3:
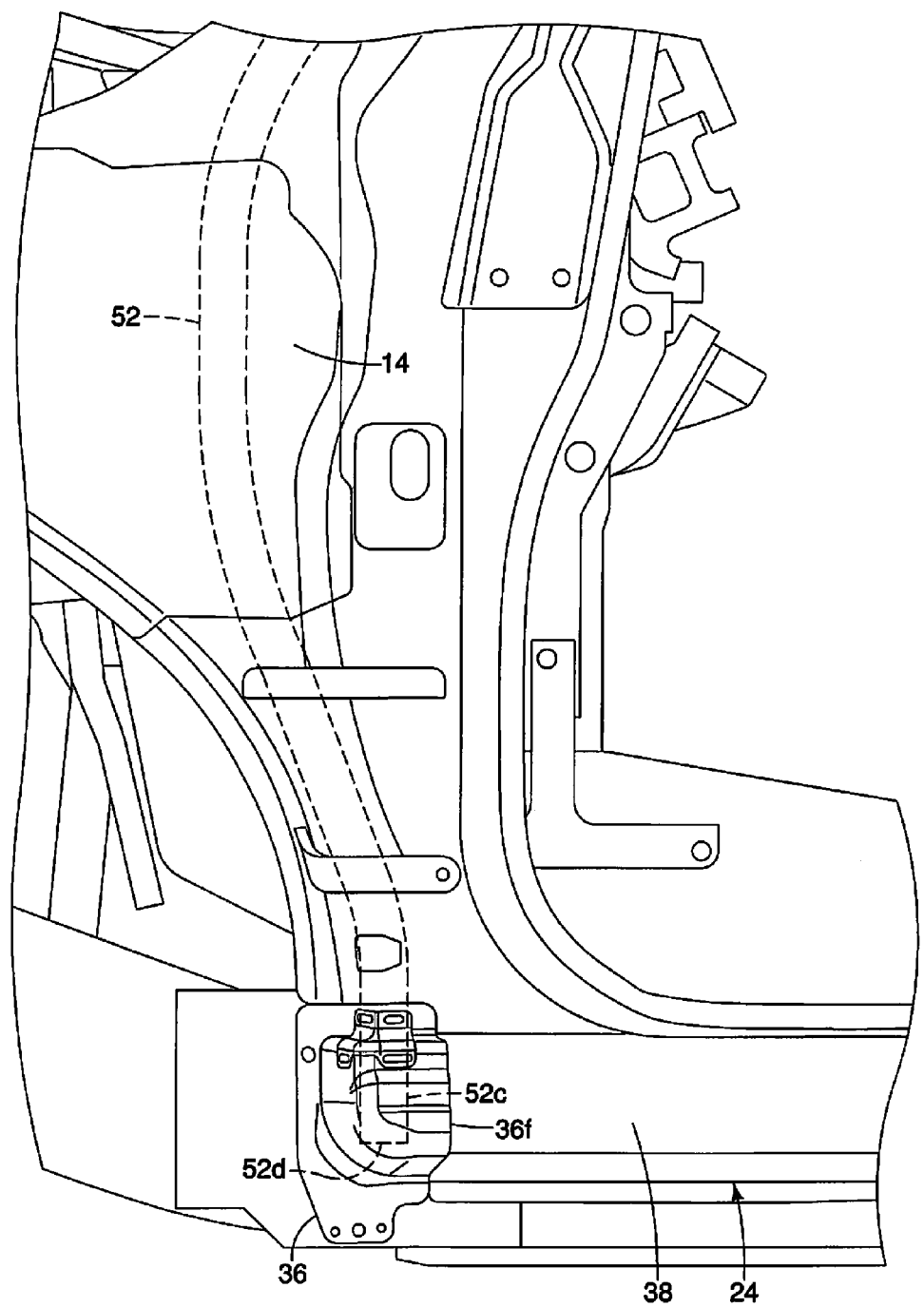
FIG. 3 is a partial side view of a reinforcement member disposed in the A-pillar of a vehicle body structure.
Figure 4:
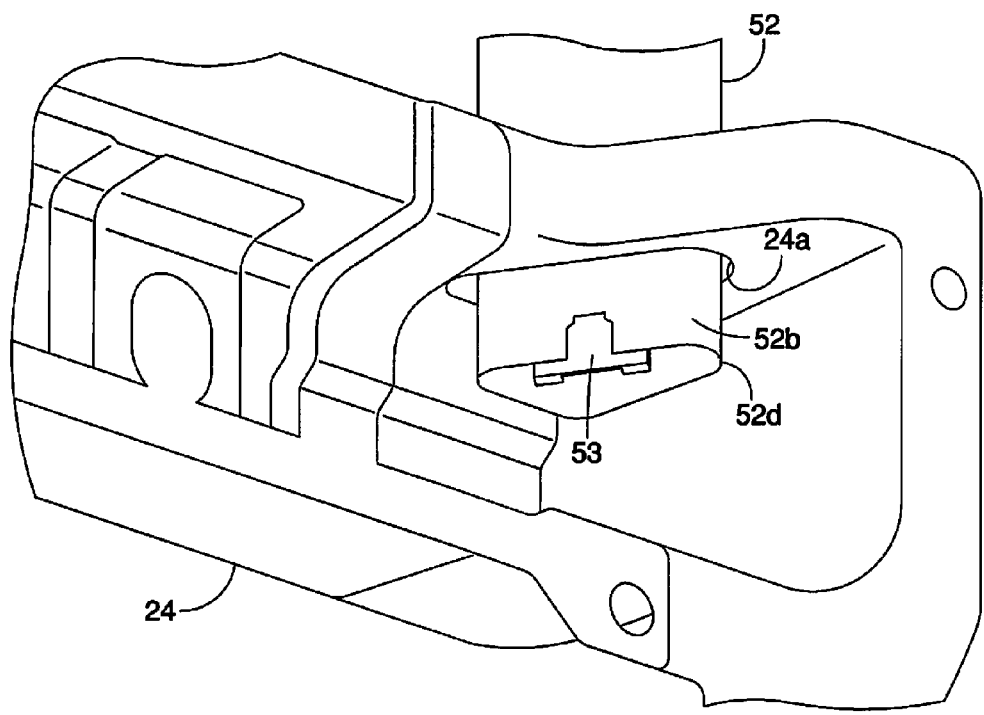
FIG. 4 is a bottom perspective view of the sill structure with the reinforcement member disposed in an aperture thereof.

As shown in FIGS. 2-4, the sub-assembly is formed basically as an inner assembly or panel 20 and an outer assembly or panel 22. The subassembly includes a sill structure 24, an A-pillar (i.e., the pillar structure 14), a front roof supporting bracket 26, a roof side rail 28 and a B-pillar 30. In one embodiment, the A-pillar (i.e., the pillar structure 14) is the most forward pillar structure The sub-assembly can additionally include a C-pillar 32 and, depending upon the size and type of vehicle, the sub-assembly can alternatively also include a D-pillar (not shown). More specifically, additional elements of the sub-assembly are dependent upon the specific design of the vehicle. For example, while a pick-up truck vehicle 10 is illustrated in FIG. 1, the present invention is not limited to such a vehicle and can be employed in any suitable vehicle. For example, if the vehicle is a four door SUV (sports utility vehicle), the sub-assembly can include both a C-pillar 32 and the D-pillar. However, if the vehicle is, for example, a two door coupe, the sub-assembly can additionally include the C-pillar 32, but not necessarily the D-pillar. The various elements of the sub-assembly can be made of, for example, sheet metal. Alternatively, the sub-assembly can be made of aluminum, aluminum alloys, or other metallic materials.

The sill structure 24 is basically a hollow assembly that extends horizontally rearward from a lower end of the pillar structure 14 to proximate the rear 34 of the vehicle 10, and includes a sill cap 36 and a sill beam 38. As shown in FIG. 3, the sill cap 36 is configured to couple to the longitudinally extending sill beam 38 at a rear facing surface 36*f* thereof in any manner desired (i.e., welding). The sill structure 24 extends in a direction transverse to the pillar structure 14. As would be understood, the sill structure 24 has an inner portion and an outer portion formed by the inner panel 20 and an outer panel 22.

The pillar structure 14 is similarly a hollow support assembly that is contoured such that the sill structure 24, the pillar structure 14, a forward section 28a of the roof side rail 28 and the B-pillar 30 define an opening 40 for a front door 42 of the pick-up truck vehicle 10. The front roof supporting bracket 26 is a bracket fixed (e.g. welded) to the pillar structure 14 and supports the roof structure 18. The front roof supporting bracket 26 also at least partially defines a windshield opening 44 with the pillar structure 14 and portions of the roof structure 18.

Figure 8:
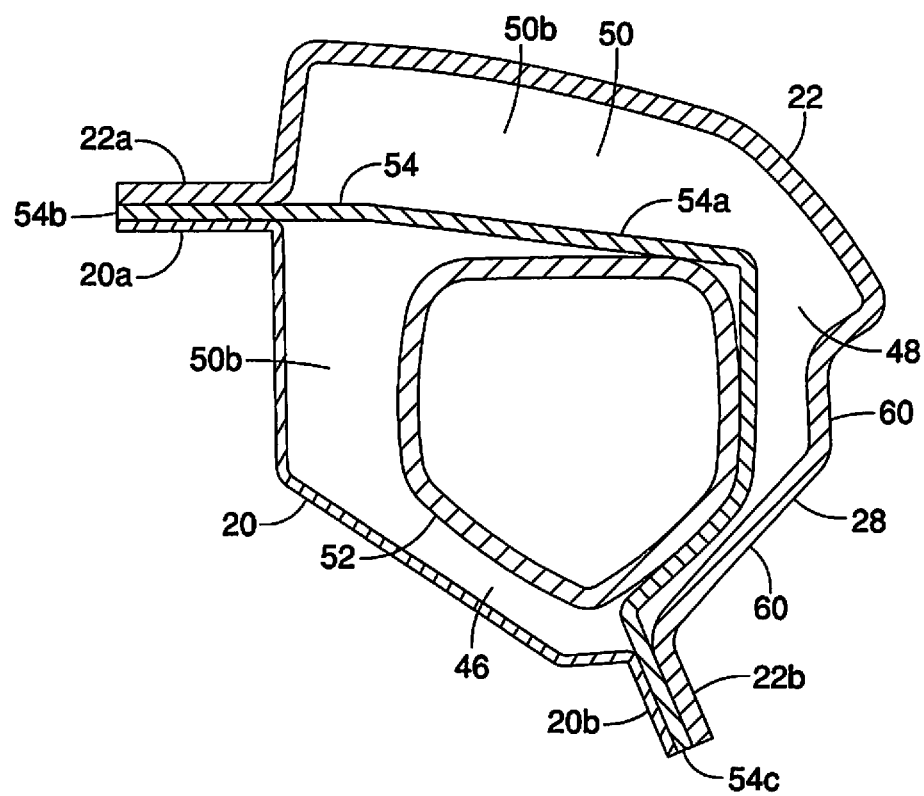
FIG. 8 is a cross sectional view of the vehicle body structure shown in FIG. 2 taken along lines 8-8, along with the inner panel of the vehicle body structure.

The roof side rail 28 is basically a conventional hollow beam assembly that extends horizontally rearward from an upper end 14a of the pillar structure 14 towards the rear 34 of the pick-up truck vehicle 10. The roof side rail 28 has an inner portion 46 and an outer portion 48 (FIG. 8). The roof side rail 28 extends in a direction generally transverse to the pillar structure 14.

A description of the vehicle body structure 12 is now provided with initial reference to FIGS. 2-5. As stated above, the vehicle body structure 12 basically includes the inner panel 20 and the outer pillar panel 22. The inner and outer panels 20, 22 are generally mirror images of each other. As shown in FIG. 2, the driver's side inner panel 20 includes a portion of the pillar structure 14, the B-pillar 30, the C-pillar 32, the roof side rail 28 and the sill structure 24. The driver's side outer panel 22 includes a mirror image of each of these portions and can be welded together. FIG. 4 is merely a partially representation of each of the inner and outer panels 20, 22, and thus the entirety of each panel is not illustrated. When welded together, the inner and outer portions 20, 22 form a generally hollow structural member that basically forms the vehicle body structure 12. Thus, as would be understood, when connected together, the inner and outer portions 20, 22 form a cavity 50 (as shown for example in FIGS. 6-8). Accordingly, the cavity 50 can include a cavity 50a for the pillar structure 14 (that is, for each of the pillars), a roof side rail cavity 50b and a sill structure cavity 50c (FIG. 2). Additionally, as shown in FIG. 2, the cavity 50a of the pillar structure 14 can have a reinforcement member 52 disposed therein, the cavity 50b of the roof side rail 28 has a reinforcement bracket 54 disposed therein, and the pillar structure 14 can have a reinforcement bracket 56 disposed therein.

Figure 5:
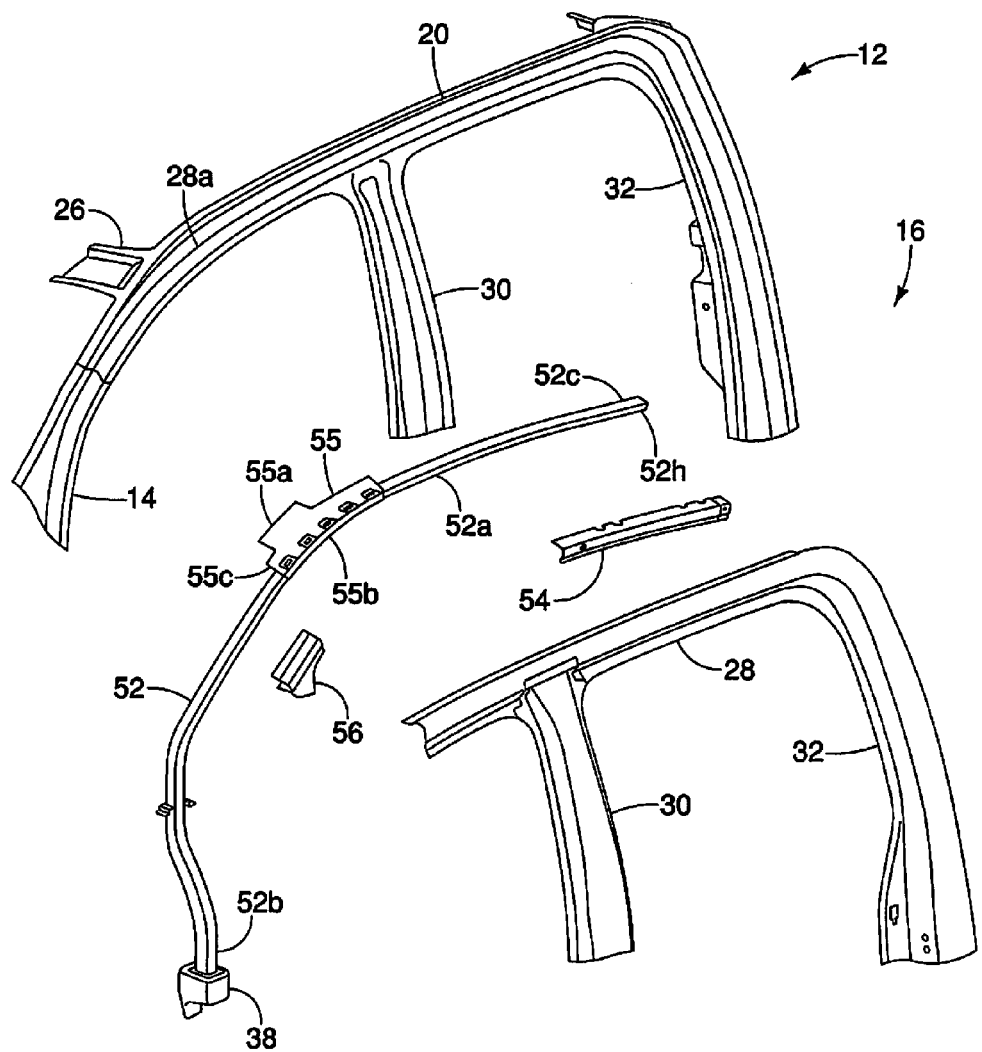
FIG. 5 is an exploded partial perspective view of the vehicle body structure in accordance with an embodiment of the present invention.
Figure 6:
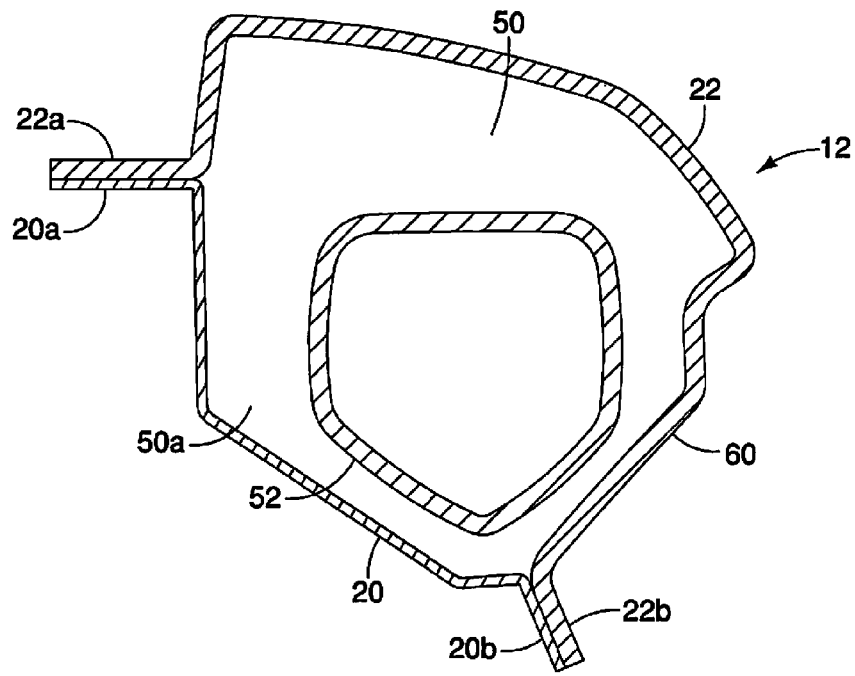
FIG. 6 is a cross sectional view of the vehicle body structure shown in FIG. 2 taken along the 6-6, along with the inner panel of the vehicle body structure.

As shown in FIG. 5, the inner panel 20 of the vehicle body structure 12, along the pillar structure 14 includes a first flange 20a and a second flange 20b, and the outer panel 22 of the vehicle body structure 12, along the pillar structure 14 includes a first flange 22a and a second flange 22b. The first and second flanges 20a, 20b of the inner panel 20 are connected to inner panel 20 in any suitable manner. In one embodiment, the inner panel 20 has three portions that enable the first and second flanges 20a and 20b to extend at an angle greater than 180 degrees. The first and second flanges 22a and 22b are connected to the outer panel 22 in any suitable manner. In one embodiment, the outer panel 22 has 4-5 portions that enable the first and second flanges 22a and 22b to extend at an angle greater than 180 degrees.

The first and second flanges 20a and 20b of the inner panel 20 and the first and second flanges 22a, 22b of the outer panel 22 are coupled together in any suitable manner (e.g., welded) that would enable a box section 60 with a cavity 50a to be formed. As is understood, the first and second flanges 20a, 20b of the inner panel 20 and the first and second flanges 22a, 22b of the outer panel 22 enable the vehicle body structure 12 to connect to other portions of the pick-up truck vehicle 10 (e.g., the roof panel).

Moreover, as illustrated in FIGS. 3-7, a reinforcement member 52 is disposed within the pillar structure 14. The reinforcement member 52 is preferably a hydroformed tubular member, but can be any suitable reinforcement member. Hydroforming is a specialized type of die forming that uses a high pressure hydraulic fluid to press room temperature working material into a die. To hydroform aluminum into a vehicle's frame rail, a hollow tube of aluminum is placed inside a negative mold that has the shape of the desired result. High pressure hydraulic pumps then inject fluid at very high pressure inside the aluminum tube which causes it to expand until it matches the mold. The hydroformed aluminum is then removed from the mold. Hydroforming allows complex shapes with concavities to be formed, which would be difficult or impossible with standard solid die stamping. Hydroformed parts can often be made with a higher stiffness-to-weight ratio and at a lower per unit cost than traditional stamped or stamped and welded parts. Virtually all metals capable of cold forming can be hydroformed, including aluminum, brass, carbon and stainless steel, copper, and high strength alloys.

As shown in FIGS. 3, 4, 5 and 9, the reinforcement member 52 includes an upper section 52a and a lower section 52b, the upper section 52a extending at an upward and rearward angle from the lower section 52b to an upper end 52c. The lower section 52b includes a lower terminal end 52d, the lower terminal end 52d being located within the sill structure cavity 50c defined by the sill structure 24; however, in one embodiment, the lower terminal end 52d of the lower section 52b is free from contact with the sill structure 24. That is, the reinforcement member 52 can extend through an aperture 24a in the sill structure. A noise reduction structure 53 is installed in the lower terminal end 52d of the reinforcement member 52 to reduce transfer of noise and vibrations. The lower section 52b of the reinforcement member 52 extends substantially vertically upward from the sill structure 24, but may have some contour or shape corresponding to the body shape of the vehicle.

A reinforcement bracket 55 can be formed with or coupled to the reinforcement member 52. Preferably reinforcement bracket 55 can couple to the roof supporting bracket 26. Reinforcement bracket 55 can be disposed in at least one of the pillar cavity 50a and the roof rail cavity 50b. In one embodiment, the reinforcement bracket 55 has a first end located in the pillar cavity 50a, and a second end located in the roof rail cavity 50b. The reinforcement bracket 55 has a first attachment portion 55a attached to the pillar structure 14 at a first location, a second attachment portion 55b attached to the pillar structure 14 at a second location opposite the first location, and a body portion 55c extending across the pillar cavity between the first attachment portion 55a and the second attachment portion 55b, the body portion 55c being attached to the reinforcement member 52. Thus, reinforcement bracket 55 has a generally similar cross sectional structure to brackets 54 and 56 described herein.

As described above, the sill structure 24 includes a longitudinally extending sill beam 38 and a sill cap 36 attached to an end of the sill beam 38. As shown in FIGS. 10 and 11, the sill cap 36 has a generally rectangular shaped body portion 36a with an opening 36b in an upper surface 36c thereof. The upper surface 36c is generally parallel to the ground and is configured to enable the reinforcement member 52 to extend through the opening 36b and into a cavity or recess 36d. A flange portion 36e is disposed along an inner side of the body portion 36a. The flange portion 36e can be generally transverse or perpendicular to the upper surface 36c of the body portion 36a. Accordingly, the opening 36b in the sill cap 36 can define an aperture or opening into which the reinforcement member 52 is disposed in the sill structure. Moreover, the sill cap 36 can be attached to a lower section 52b of the reinforcement member 52.

As shown in FIG. 10, in one embodiment, a mounting bracket 62 coupled the reinforcement member 52 to the sill cap 36. In this embodiment, the mounting bracket 62 can be attached to the reinforcement member 52 on two sides. For example, the mounting bracket 62 can attached to the reinforcement member 52 at least on a forward side 52e and an outboard side 52f of the reinforcement member 52, and is attached to the sill cap 36 at least on a forward side 36g and an outboard side 36h of the sill cap 36.

As shown in FIG. 12, the mounting bracket 62 has an upward extending flange section 62a that is attached to the reinforcement member 52, a downward extending flange section 62b attached to the sill structure 24 (e.g., the sill cap 36), and a horizontal section 62c extending between the upward extending flange section 62a and the downward extending flange section 62b and across a portion of the upper surface of the sill structure 24 (e.g., the upper surface 36c of the sill cap 36). Thus, as would be understood, the mounting bracket 62 is attached to the sill structure 24 (in particular to the sill cap 36) on two sides.

Figure 7:
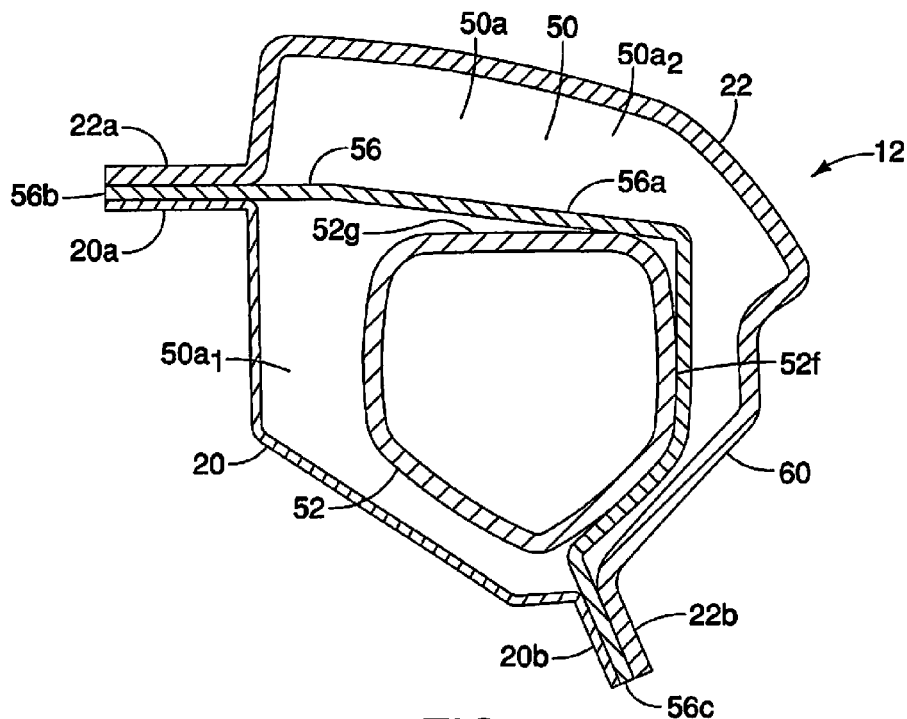
FIG. 7 is a cross sectional view of the vehicle body structure shown in FIG. 2 taken along lines 7-7, along with the inner panel of the vehicle body structure.

As shown in FIG. 7, one embodiment includes a reinforcement bracket 56 that extends across the pillar cavity 50a. The reinforcement bracket 56 can be formed from any suitable material, such as aluminum. In this embodiment, the reinforcement bracket 56 can have a body structure 56a, a first attachment structure 56b and a second attachment structure 56c. The first attachment structure 56b is attached to the pillar structure 14. The second attachment structure 56c is opposite the first attachment structure 56b and is attached to the pillar structure 14. The body portion 56a extends between the attachment structures 56b, 56c and is attached to the reinforcement member 52. The body structure 56a of the reinforcement bracket 84 can include a plurality of sections that enable the reinforcement bracket 56 to wrap around or partially around the reinforcement member 52, and couple to at least two sides of the reinforcement member 52. In one embodiment, the body structure 56a of the reinforcement bracket 56 attaches to the tubular reinforcement member on an upper side 52g and the outboard side 52f of the reinforcement member 52.

The reinforcement bracket 56 divides the pillar cavity 50a into an inner portion $50a_1$ and an outer portion $50a_2$ with the tubular reinforcement member 52 located at least partially disposed within the inner portion $50a_1$ of the pillar cavity 50a. Moreover, the reinforcement member 52 can be attached to a front roof supporting bracket (such as front roof supporting bracket 26).

The first attachment section 56b is configured to be disposed between the first flange 20a of the inner panel 20 and the first flange 22a of the outer panel 22 of the vehicle body structure 12. Similarly, the second attachment section 56c is configured to be disposed between the second flange 20b of the inner panel 20 and the second flange 22b of the outer panel 22 of the vehicle body structure 12.

The reinforcement bracket 56 further strengthens the pillar structure 14 to facilitate transfer of forces to and along the reinforcement member 52.

Figure 9:
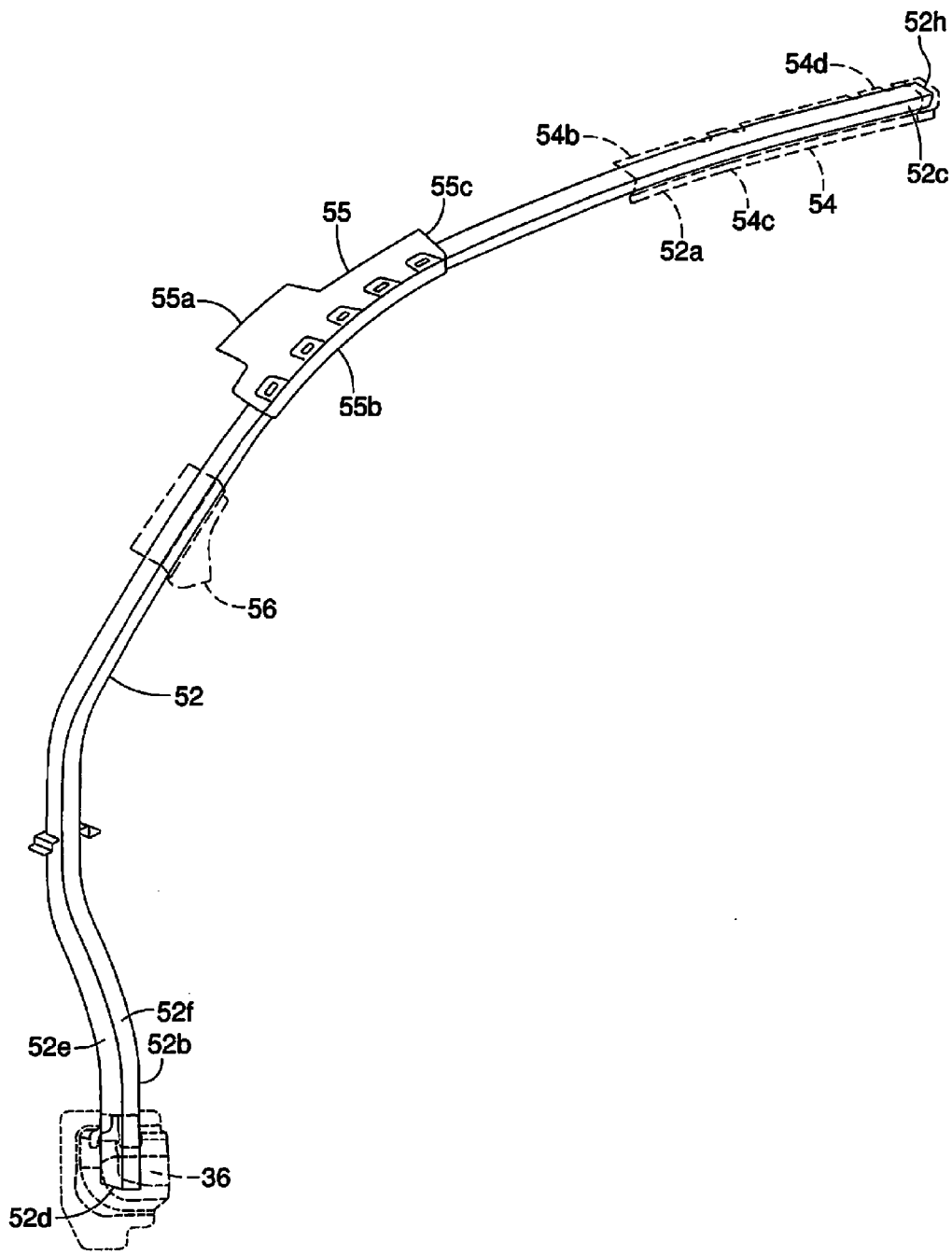
FIG. 9 is a perspective view of the reinforcement member shown in FIG. 4.

As shown in FIGS. 2, 4 and 9, the upper section 52a of the reinforcement member 52 has an upper end 52h coupled to the roof side rail 28. For example, in one embodiment, the upper end 52h is attached to a second pillar structure (e.g., the B-pillar 30). Such a configuration can effectively transfer forces, particularly from roof crush tests, to the B-pillar 30. In this embodiment, the second pillar structure (i.e., the B-pillar 30) is longitudinally offset from the first pillar structure 14 (i.e., the A-pillar). However, the upper end 52h of the reinforcement member 52 can be attached to any suitable portion of the roof side rail 28 or the vehicle body structure 12.

As shown in FIGS. 2, 8 and 10, in one embodiment, a reinforcement bracket 54 extends across the roof rail cavity 50b and has a body structure 54a, a first attachment section 54b and a second attachment section 54c. The body structure 54a extends between the first and second attachment sections 54b, 54c of the second reinforcement bracket 54 and is attached to the reinforcement member 52. The first attachment section 54b is attached to the roof side rail 28. The second attachment section 54c is opposite the first attachment section 54b and is attached to the roof side rail 28. The body structure 94 of the reinforcement bracket 54 can include a plurality of sections that enable the reinforcement bracket 54 to wrap around or partially around the reinforcement member 52, and couple to at least two sides of the reinforcement member.

The first attachment section 54b is configured to be disposed between the first flange 20a of the inner panel 20 and the first flange 22a of the outer panel 22 of the vehicle body structure 12. Similarly, the second attachment section 54c is configured to be disposed between the second flange 20b of the inner panel 20 and the second flange 22b of the outer panel 22 of the vehicle body structure 12.

The reinforcement bracket 54 further strengthens the pillar assembly to facilitate transfer of forces to and along the reinforcement member 52.

The reinforcement bracket 56 is disposed in the roof rail cavity 50b of the roof side rail 28 of the vehicle body structure 12. The roof side rail 28 includes an inner roof rail portion 46 of the inner panel 20 and an outer roof rail portion 48 of the outer panel 22 attached to the inner roof rail portion 48 to form a closed box section 60 defining the roof rail cavity 50b. The reinforcement bracket 56 divides the roof rail cavity 50b into an inner portion 46 and an outer portion 48, and the reinforcement member 54 is located at least partially in the inner portion 46 of the roof rail cavity 50b.

As shown in FIGS. 9 and 13, in one embodiment, the first attachment section 54b of the reinforcement bracket 54 has a rearward end 54d overlapping the upper end 52h of the reinforcement member 52. The reinforcement bracket 54 can extend over a second pillar structure (i.e., the B-pillar 30), if desired. Moreover, the reinforcement bracket 54 can be disposed in any portion of the roof side rail 28.

The embodiments of the present invention provide a vehicle body structure 12 that maintains the strength of the vehicle frame structure without appreciably increasing the cost of producing the vehicle.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure 12. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
a pillar structure having a box section defining a cavity;
a sill structure having an upper surface defining an aperture, and defining a sill cavity; and
a reinforcement member having a lower end and being disposed within the cavity of the pillar structure, the reinforcement member extending through the aperture and being attached to the sill structure, with the lower end being disposed within the sill cavity and being unconnected to the sill structure.

2. The vehicle body structure of claim 1, wherein the sill structure is disposed below the pillar structure.

3. The vehicle body structure of claim 1, wherein the reinforcement member is a hydroformed tubular member.

4. The vehicle body structure of claim 1, wherein the pillar structure is a most forward pillar in the vehicle body structure.

5. The vehicle body structure of claim 1, wherein the pillar structure includes an inner pillar panel and an outer pillar panel attached to the inner pillar panel so as to form the box section.

6. The vehicle body structure of claim 1, wherein the reinforcement member includes an upper section and a lower section, the upper section extending at an upward and rearward angle from the lower section to an upper end.

7. The vehicle body structure of claim 6, wherein the upper end is coupled to a roof rail structure.

8. The vehicle body structure of claim 6, wherein the upper end is attached to a second pillar structure, the second pillar structure being longitudinally offset from the first pillar structure.

9. The vehicle body structure of claim 1, wherein a mounting bracket is attached to the reinforcement member and the sill structure.

10. A vehicle body structure comprising:
a pillar structure having a box section defining a cavity;
a sill structure having an upper surface defining an aperture;
a reinforcement member disposed within the cavity of the pillar structure, extending through the aperture and being attached to the sill structure,
a mounting bracket attached to the reinforcement member and the sill structure, wherein
the mounting bracket is attached to the reinforcement member on a forward side and an outboard side of the reinforcement member, and is attached to the sill structure on a forward side and an outboard side of the sill structure.

11. A vehicle body structure comprising:
a pillar structure having a box section defining a cavity;
a sill structure having an upper surface defining an aperture;
a reinforcement member disposed within the cavity of the pillar structure, extending through the aperture and being attached to the sill structure,
a mounting bracket attached to the reinforcement member and the sill structure, wherein
the mounting bracket has an upward extending flange section attached to the reinforcement member, a downward extending flange section attached to the sill structure, and a horizontal section extending between the upward extending flange section and the downward extending flange section and across a portion of the upper surface of the sill structure.

12. A vehicle body structure comprising:
a pillar structure having a box section defining a cavity;
a sill structure having an upper surface defining an aperture; and
a reinforcement member disposed within the cavity of the pillar structure, extending through the aperture and being attached to the sill structure, wherein
the sill structure includes a longitudinally extending sill beam and a sill cap attached to an end of the sill beam, the sill cap defining the aperture and being attached to a lower section of the reinforcement member.

13. The vehicle body structure of claim 9, wherein the mounting bracket is attached to an outside portion of the sill structure and to an outer surface of the reinforcement bracket.

14. The vehicle body structure of claim 13, wherein the lower end is suspended in the sill cavity and free from contact from the sill structure.

15. The vehicle body structure of claim 1, wherein the lower end is suspended in the sill cavity and free from contact from the sill structure.

* * * * *